United States Patent [19]

Pellicane et al.

[11] Patent Number: 5,531,155
[45] Date of Patent: Jul. 2, 1996

[54] COOKING APPARATUS FOR TWO-SIDED COOKING

[75] Inventors: Jack E. Pellicane, Rockton, Ill.; Jon P. Russett, Beloit, Wis.; Jeffery L. Sands, Freeport, Ill.

[73] Assignee: Specialty Equipment Companies, Inc., Rockton, Ill.

[21] Appl. No.: 550,211

[22] Filed: Oct. 30, 1995

[51] Int. Cl.$^6$ .................................................. A47J 37/06
[52] U.S. Cl. ................................. 99/349; 99/372; 99/379
[58] Field of Search ............................... 99/349, 353–355, 99/426, 432, 372–380, 422–426, 389, 390, 391, 394; 219/524, 525, 443, 388; 100/93 P, 233; 425/136, 151, 160, 298, 324.1, 343, 293, 317, 394; 426/496, 512

[56] References Cited

U.S. PATENT DOCUMENTS

| | | | |
|---|---|---|---|
| 3,880,064 | 4/1975 | Martinez | 99/372 |
| 4,165,682 | 8/1979 | Weiss | 219/524 |
| 4,483,239 | 11/1984 | Mueller et al. | 99/379 |
| 4,567,819 | 2/1986 | Adamson | 99/391 |
| 4,586,428 | 5/1986 | Adamson | 99/349 |
| 4,601,237 | 7/1986 | Harter et al. | 99/379 |
| 4,697,504 | 10/1987 | Keating | 99/349 |
| 4,700,619 | 10/1987 | Scanlon | 99/379 |
| 4,763,571 | 8/1988 | Bergling et al. | 99/372 |
| 4,878,424 | 11/1989 | Adamson | 99/349 |
| 5,197,377 | 3/1993 | Jennings et al. | 99/390 |
| 5,341,727 | 8/1994 | Dickson | 100/93 P |
| 5,469,779 | 11/1995 | Amore et al. | 99/353 |

*Primary Examiner*—Timothy F. Simone
*Attorney, Agent, or Firm*—Vernon J. Pillote

[57] ABSTRACT

Cooking apparatus having an upper cooking platen mounted on a support arm for swinging movement between a lower cook position and a raised position. The upper platen is mounted on the support arm for limited floating movement and upper platen adjusting mechanism is provided which engages the lower platen at a plurality of spaced points and which is adjusted by a single manually operated control. Upper platen lift assist mechanism has pressurized gas cylinders arranged so that the gas cylinders do not exert substantial upward or downward force on the upper platen arm when the upper platen is in a cook position, and assist raising the upper platen when the platen support arm is lifted out of the cook position.

32 Claims, 6 Drawing Sheets

COOKING APPARATUS FOR TWO-SIDED COOKING

BACKGROUND OF THE INVENTION

Cooking apparatus have heretofore been made with upper and lower cooking platens for two-sided cooking of food products such as hamburger patties. Two-sided cooking apparatus generally reduces the overall cooking time and amount of operator attention required for cooking the food products. However, there are a number of interrelated problems encountered in two-sided cooking apparatus, that are not presented in single surface grills.

The upper cooking platen in two-sided cooking apparatus for commercial food service establishments are generally large enough to enable cooking of a number of individual patties at the same time. The patties are preformed in several different nominal sizes and thicknesses and are commonly frozen for storage and transportation. The frozen patties are relatively rigid when initially placed on the lower cooking platen and if the upper platen rests only on the thickest patty or patties, even small differences in the initial thickness of the patties in the group being cooked could delay good heat transmitting contact between the upper platen and some of the thinner patties and result in uneven cooking of the patties. On the other hand, the patties soften and shrink or decrease in thickness as they thaw and cook. The weight of the upper cooking platen, if unrestrained or controlled, is such that it could excessively compress or compact the patties and adversely affect the final thickness, texture and appearance of the cooked patties. Thus, two-sided cooking apparatus presents several special problems including accommodating variations in initial thickness of the individual patties in the group being cooked; controlling the decrease in thickness of the patties that occurs during cooking; preventing excess compaction of the patties; and accommodating different groups of food products of nominally different thicknesses.

In order to control the spacing of the upper platen relative to the lower platen during cooking, prior clamshell grills have also been made with a plurality of upper platen stops adjustably mounted on the upper platen for engagement with the upper surface of the lower platen.

In U.S. Pat. No. 4,763,571, four stop pins are provided to extend to the cooking surface of the upper platen adjacent the corners and these pins had to be individually adjusted to change the platen spacing. U.S. Pat. No. 4,586,428 provided a single stop at the forward end of the platens support arm, and four individually adjustable stops for adjusting the vertical position of the upper platen relative to the support arm. U.S. Pat. No. 4,483,239 adjusted the pivot axis that supported the rear of the upper platen and provided a single stop at the front of the upper platen to control the spacing of the platens. U.S. Pat. No. 4,601,237 provides four cams that are interconnected for adjustment in pairs, to control the spacing between the platens. Each of the above required the adjustment of at least two and sometimes four adjustment devices in order to change the minimum spacing between the upper and lower cooking platens.

The upper platens in two-sided cooking apparatus are relatively heavy and present a problem of raising and lowering the upper platen at the beginning and end of a cooking cycle. U.S. Pat. Nos. 4,586,428 and 4,763,571 provide vertically movable counterweights to normally bias the upper platen to a raised condition and latch mechanism for holding the upper platen in a lowered condition. U.S. Pat. No. 4,483,239 provides a vertically arranged power cylinder with means for selectively actuating the power cylinders to raise and lower the upper platen. U.S. Pat. No. 4,165,682 provides a plurality of vertically disposed springs connected to the upper platen support arm at the rear of the cooking apparatus to aid in raising the upper platen.

SUMMARY OF THE INVENTION

The present invention relates to a two-sided cooking apparatus having a lower cooking platen mounted on a support structure and an upper cooking platen mounted on a platen support arm for swinging movement about a horizontal pivot axis between a lower cook position and a raised position. It is a general object of the present invention to provide a two-sided grill apparatus which can accommodate variations in initial thickness of the individual patties of the group being cooked; accommodate the decrease in thickness of the patties that occurs during cooking; accommodate different groups of patties of nominally different thickness, and in which the minimum spacing between the upper and lower platens can be adjusted to adapt the two-sided grill to control cooking of the food products to a different desired final product thickness.

In accordance with one aspect of the present invention, the upper platen is supported on an arm pivotally mounted for movement between a lower position extending above the lower cooking platen and a raised position inclined upwardly from the lower platen, and first and second ramp means are mounted on the upper cooking platen at relatively opposite sides for adjusting the spacing of the upper platen relative to the lower platen. The first and second ramp means each include a stationary ramp member fixed to the upper platen and having a downwardly facing guide face inclined at an acute angle to the cooking surface of the upper platen, and a movable ramp member mounted on each stationary ramp member for sliding movement along a path paralleling the inclined guide face on the stationary ramp member, the movable ramp members each having means at a lower side for engaging the lower platen at spaced locations. Upper platen adjusting means is provided for slidably moving the movable ramp members relative to the associated stationary ramp members to simultaneously adjust the first and second ramp means.

The first and second ramp means are advantageously mounted at the front and rear sides of the upper platen and the upper platen adjusting means includes a lever mounted intermediate its ends for pivotal movement in a plane generally paralleling the cooking surface on the upper platen.

It is another object of the present invention to provide a clamshell type grill having a sufficiently low profile for use on the counter top or cabinet, and which has an improved arrangement for assisting in lifting the upper platen without increasing the overall height of the apparatus. Accordingly, the present invention provides a clamshell grill having an upper platen lift assist that includes a lever mounted on the support structure for pivotal movement about a lever pivot axis spaced below the pivot axis of the upper platen support arm and a pressurized gas cylinder having a lengthwise axis extending in a front to rear direction relative to the grill and connected to the lever at a location spaced from the lever pivot axis. Means operatively connects the upper platen support arm to the lever for positioning the lever in a substantially dead center position with relation to the lengthwise axis of the cylinder means when the upper platen is supported on the lower platen, the means connecting the upper platen to the support arm being constructed and arranged to move the lever in one angular direction out of the dead center position as the support arm is raised, the cylinder means being arranged to aid in raising the support arm and the upper platen when the lever is moved in said one angular direction away from the dead center position.

DETAILED DESCRIPTION

Figure 2:
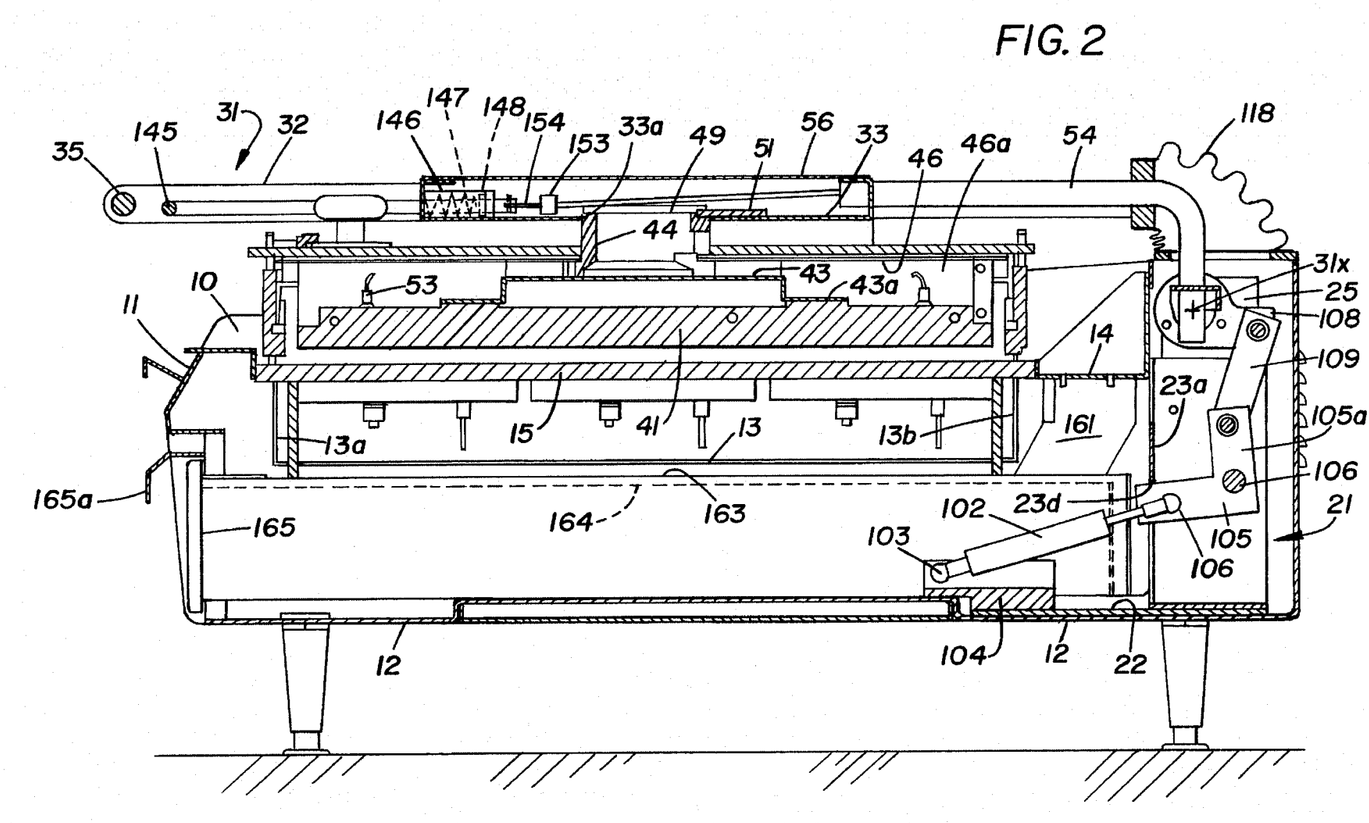
FIG. 2 is a vertical sectional view taken on the plane 2—2 of FIG. 1.

The cooking apparatus support structure in general comprises a main frame having spaced sides 10, a front panel 11, a bottom wall 12, and an intermediate wall 13 (FIG. 2) that extends between the sides 10 and are preferably welded together to provide a rigid main frame. The intermediate wall 13 has upwardly extending front and rear panels 13a and 13b adapted to engage a lower cooking platen 15, and a debris trough 14 extends between the side panels 10 along a rear edge of the lower platen, with the bottom of the trough offset below the cooking surface of the lower platen as shown in FIG. 2. The lower platen is advantageously welded to the side walls 10, trough 14 and front panel 11 to seal the joints therebetween against passage of grease and provide a rigid frame structure.

The support structure also includes an auxiliary frame 21 having a generally L-shaped configuration as viewed from the side, and including a base portion 22 adapted to De supported on a rear portion of the bottom wall 12 of the main frame, and in an upright portion 23 extending upwardly adjacent the rear end of the base portion. In the embodiment illustrated, the upright portion includes a front panel 23a and side panels 23b extending rearwardly adjacent opposite edges of the front panel. The base portion 22 and upright portion 23a, 23b of the auxiliary frame are conveniently formed of heavy gauge sheet metal and welded together, and mounting bars 25 are secured as by fasteners to the side panels 23b to pivotally support an upper cooking platen described hereinafter. The auxiliary frame 21 is detachably secured to the main frame by fasteners (not shown) that extend through the base portion 22 of the auxiliary frame and the bottom 12 of the main frame.

Figure 7:
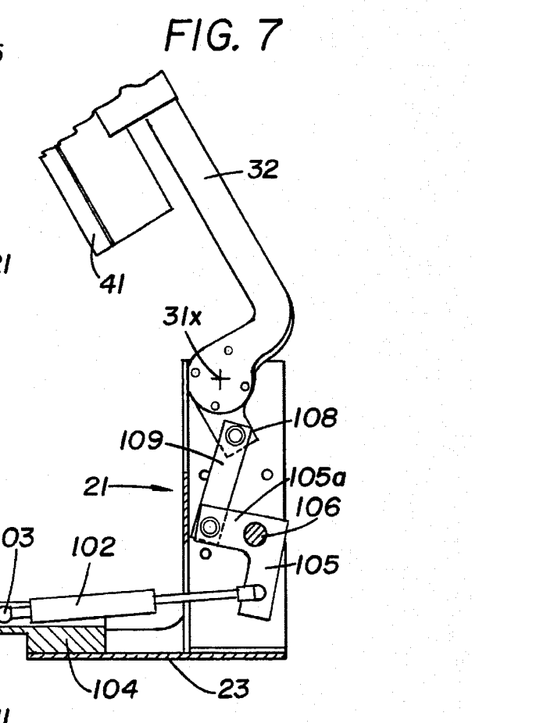
FIG. 7 is a fragmentary end view of the upper platen and platen support, taken on the plane 2—2 of FIG. 1, illustrating the upper platen in a raised position.

An upper platen support arm 32 is pivotally mounted at its rear end on the auxiliary frame for movement about an arm pivot axis 31x between a lower position as shown in FIG. 2 extending above the lower cooking platen and a raised position as shown in FIG. 7 inclined upwardly from the lower cooking platen. In the embodiment shown, the upper platen support arm includes elongated bars that are rigidly connected intermediate their ends by a flanged panel 33. The bars have downturned rear end portions supported by bearings in the upper ends of the bars 25, for pivotal movement relative to the auxiliary frame about a horizontal axis designated 31x. An operating handle 35 extends between the forward ends of the bars for manual raising and lowering of the upper platen support arm. An upper cooking platen 41 is mounted on the support arms 32 for raising and lowering thereby and for limited movement relative thereto. As best shown in FIG. 2, an upper platen mounting panel 43 having offset flanges 43a is secured to the upper side of the upper platen and a generally cylindrical hub 44 has a lower end secured to the panel 43 at a location such that the axis of the cylindrical hub 44 is substantially aligned with the geometric center of the cooking platen. A cover is provided on the upper side of the upper cooking platen and includes side panels 46a and end panels 46b secured to the upper cooking platen adjacent the outer periphery and a top panel 46 secured to the side and end panels 46a and 46b. The hub 44 extends through an opening 46c in the top panel 46 and the hub 44 has an outwardly extending rim portion at its lower end providing an upwardly facing shoulder that underlies the panel 46 around the opening 46c. The upper portion of the hub loosely extends through an opening 33a in the panel 33 on the support arm and stop plates 49 are secured to the upper end of the hub and overlie the panel 33 to limit downward movement of the upper cooking platen relative to the support arm while accommodating limited vertical movement and tilting of the hub relative to the support arm. A member 51 is secured to the panel 33 on the support arm and extends into a slot in the hub 44 to inhibit turning of the upper platen relative to the support arm about the axis of the hub.

Figure 1:
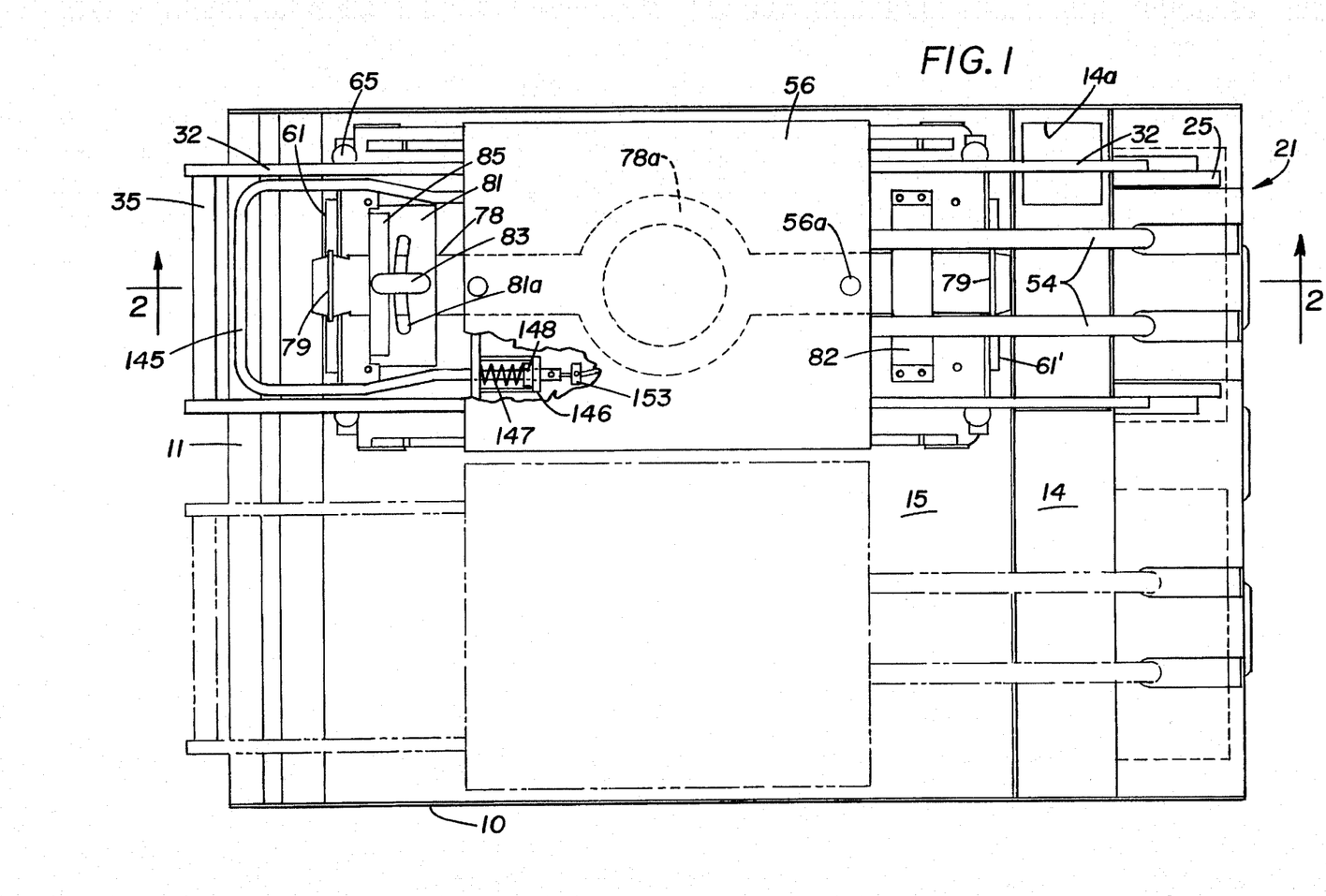
FIG. 1 is a plan view of the cooking apparatus, with one upper cooking platen in a lowered position.

The upper platen 41 shown herein is of the type that is heated by one or more electrical heating elements indicated at 52, with one or more temperature sensors 53 for sensing the temperature of the upper cooking platen. The electrical conductors for the heating elements and for the temperature sensors are passed from the area below the platen cover into and through the hub 44 into the space between the levers 32 of the support arm, and generally L-shaped tubular conduits 54 are attached to the support arm for angular movement therewith about the pivot axis 31x. One of the tubular conduits is used for the high voltage conductors used for the heating elements and the other for low voltage conductors used for the sensors. A cover 56 is removably secured to the support arms as by fasteners 56a (FIG. 1).

Figures 3, 4:
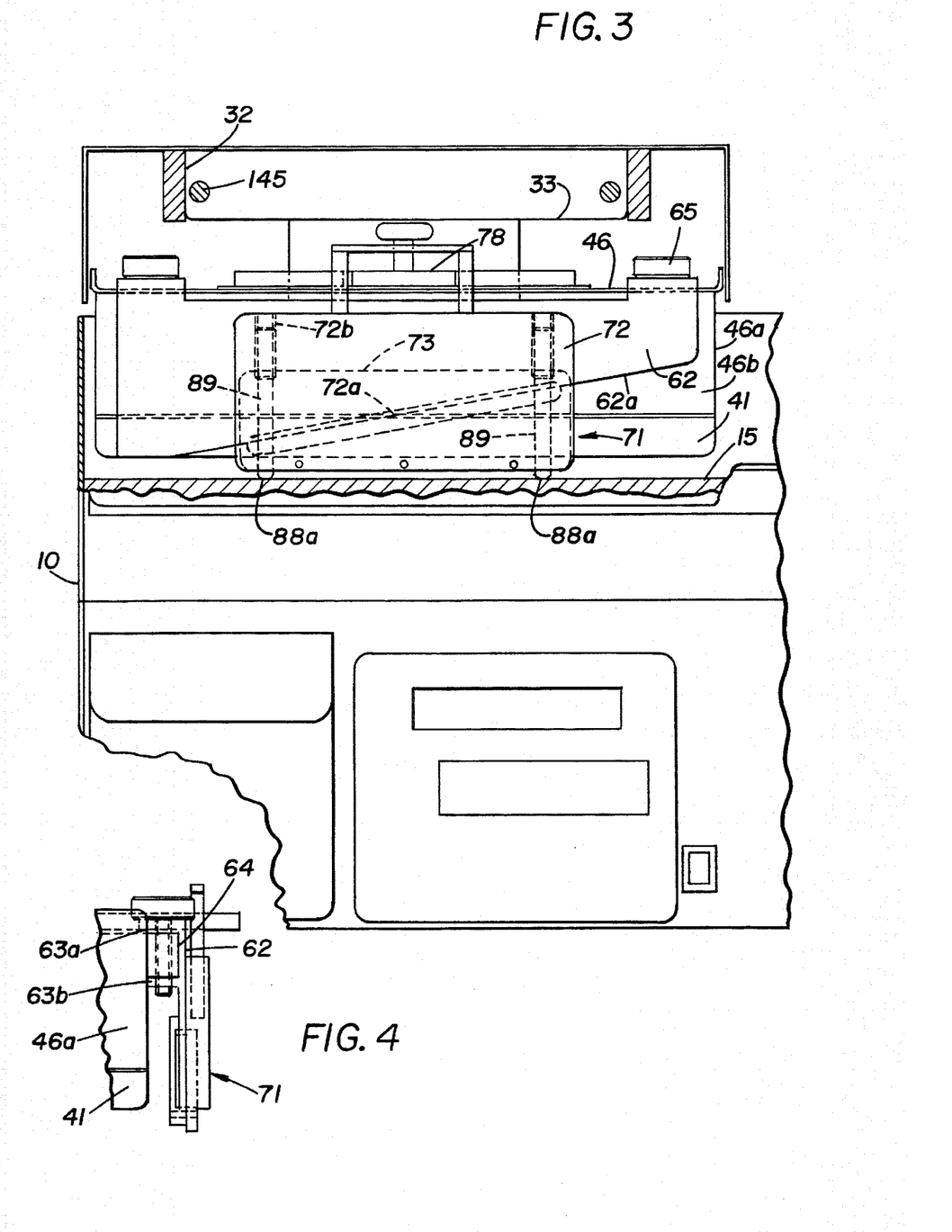
FIG. 3 is a fragmentary front view illustrating the upper platen in a closed position.
FIG. 4 is a fragmentary view showing one end of the upper platen adjusting means.
Figure 5:
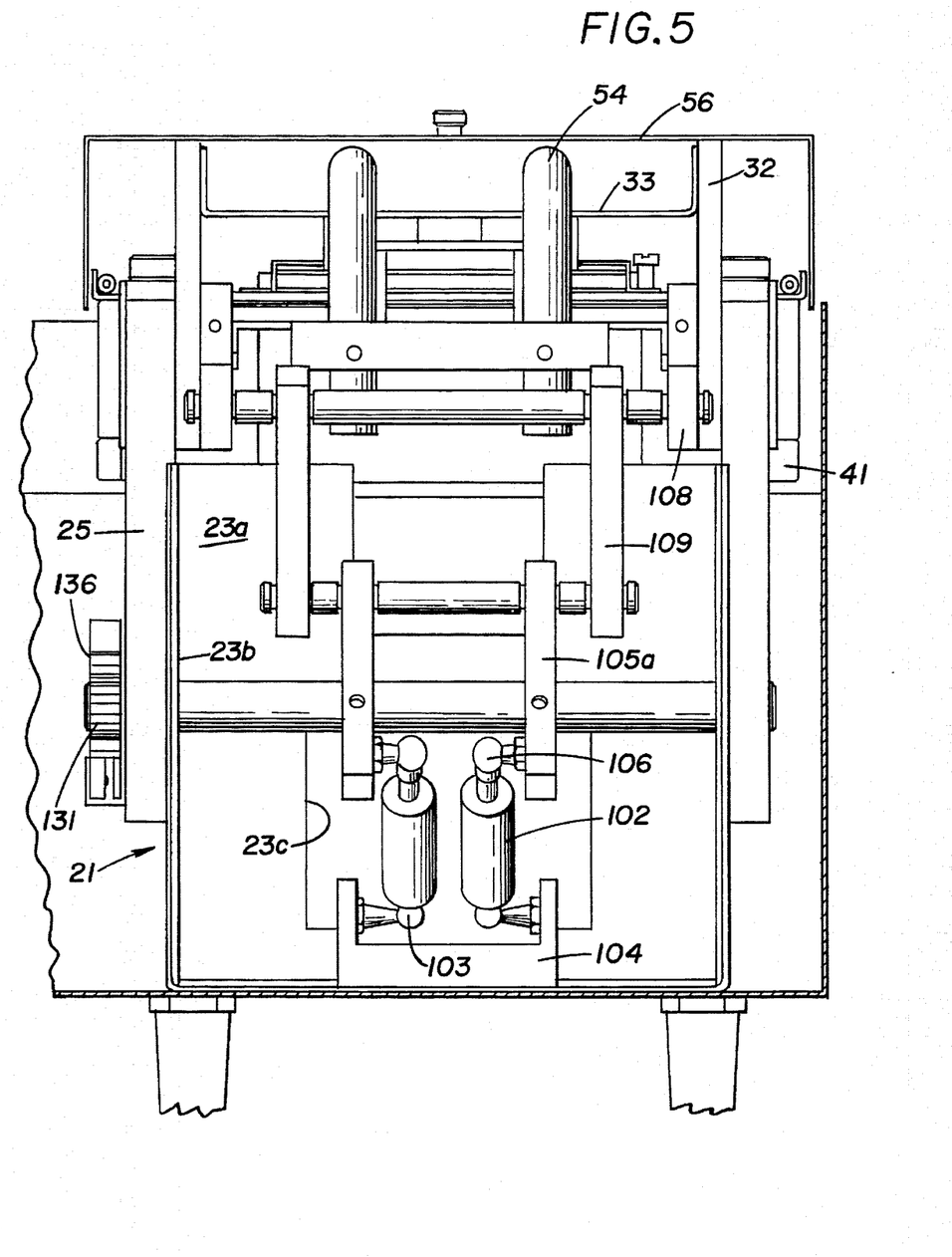
FIG. 5 is fragmentary rear view of the apparatus with the upper cooking platen in a closed position.
Figure 9:
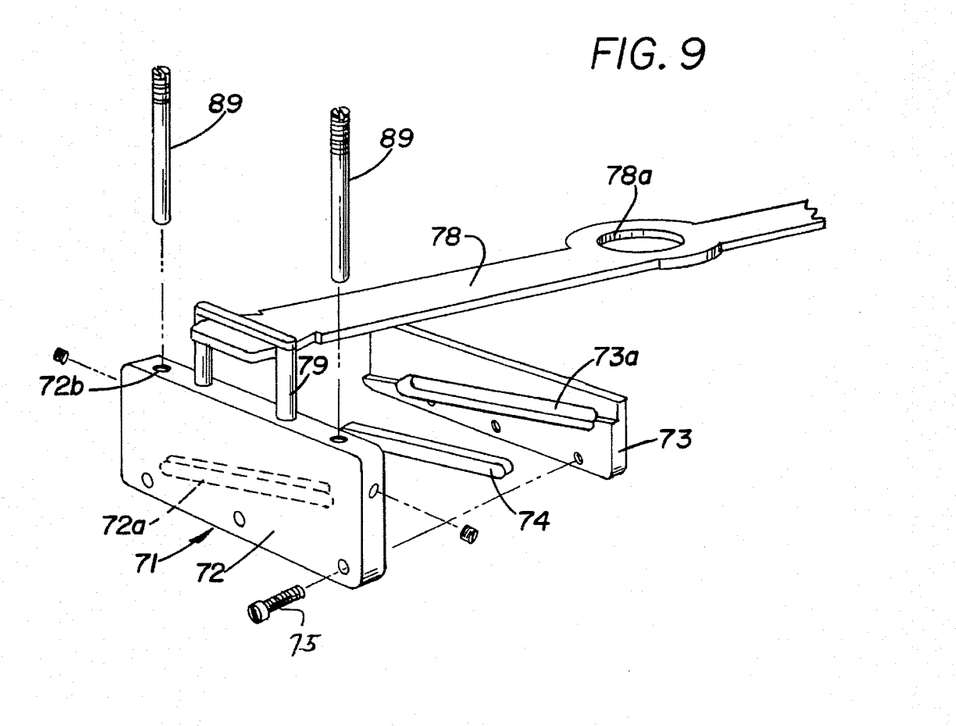
FIG. 9 is a fragmentary exploded view illustrating the upper platen adjusting means.

As previously described, the upper cooking platen is supported by the hub 44 for limited vertical movement and tilting movement relative to the upper platen support arm 31 to accommodate food products having different initial thickness. However, the food products generally flatten and shrink as they thaw and it is important to adjustably control the minimum spacing between the upper platen and lower platen, to control the final thickness of the cooked product. The upper platen has a relatively large area and is subject to warping and it is generally considered desirable to control the spacing of the upper platen at a plurality of points. The present invention provides a platen adjusting means which supports the upper platen at least four points on the lower platen, and which can be adjusted for different minimum spacings with a single manually operable lever. First and second ramp means designated 61 and 61' are mounted on the upper cooking platen at relatively opposite sides, and preferably at the front and rear sides as shown. The ramp means 61 and 61' are of like construction and like numerals are used to designate corresponding parts. As best shown in FIGS. 2–4 and 9, the ramp means includes a stationary ramp member 62 having vertically spaced flanges 63a, 63b at the rear side adjacent opposite ends. The flanges straddle a boss 64 fixed to the front panel 46b of the upper platen as by thumb screws 65 to enable easy removal for cleaning. The stationary ramp member has a downwardly facing guide face 62a inclined at an acute angle to the cooking surface of the upper platen, as best shown in FIG. 3. A movable ramp member 71 is mounted on the stationary ramp member for sliding movement relative thereto along a path paralleling the lower guide edge 62a on the stationary ramp member. As best shown in FIG. 9, the movable ramp member 71 includes a front member 72 and a rear member 73 that are secured together as by fasteners 75. The front and rear ramp members have complimentary recesses 73a and 72a on adjacent faces that receive a guide bar 74. The recesses 72a and 73a are inclined at an angle corresponding to the angle of the guide edge 62a and the guide bar 74 engages the guide edge 62a on the stationary ramp member 62 to shift the movable guide member either downwardly or upwardly relative to the stationary guide member as the movable guide member is moved horizontally.

The rear ramp 62' has the same construction as the front ramp and, when mounted at the rear side of the upper platen, the guide edge 62a is inclined in a direction opposite to that of the front ramp. An adjusting lever 78 is formed with a central eye 78a (FIGS. 1 and 9) that is rotatably supported on the hub 44, and saddles 79 on the front and rear movable ramp members straddle the respective forward and rear end of the arm 78 so that pivoting of the arm about the hub move the front and rear movable ramp member horizontally in relatively opposite directions. Since the guide edges 62a on the front and rear ramps are inclined in relatively opposite directions, the front and rear ramp members both move downwardly relative to the upper cooking platen when the front end of the lever 78 is shifted to the right as viewed in FIG. 3, and both move upwardly relative to the upper platen when the front member is moved to the left as viewed in FIG. 3. The saddle 79 can accommodate limited vertical movement of the movable ramp members relative to the upper platen and the lever is guided parallel to the cover panel on the upper platen by front and rear straps 81 and 82. The front strap is formed with an arcuate slot 81a and a knob 83 threaded on a fastener secured to the arm, is provided for selectively locking the arm in an angularly adjusted position. For convenience, a position indicator can be provided on the lever to cooperate with a scale 85 on the front guide 81 to facilitate setting of the ramp members at preselected platen spacings. In order to accurately control the platen spacing and compensate for any warpage or other misalignment, adjustable platen engaging feet are provided adjacent opposite ends of each of the movable ramp members for engaging the lower platen. As best shown in FIGS. 3 and 9, the feet are conveniently in the form of pins 89 that are threadedly adjustable in vertically disposed openings 72b adjacent each end of the movable ramp members and provide platen engaging feet 88a at their lower ends.

The upper cooking platen is relatively heavy and upper platen lift assist means is provided to assist raising of the upper platen. The two-sided cooking apparatus is preferably constructed and arranged to have a sufficiently low profile, to enable mounting of the cooking apparatus on a counter top or cabinet top and the lift assist means is arranged so that it is disposed entirely within the main frame and above the bottom of the main frame to avoid obstructing installation on a counter top or cabinet. As shown in FIGS. 2, 5, 6 and 7, pressurized gas cylinders 102 have a cylinder end pivotally mounted at 103 on a bracket 104 affixed to the base portion 22 of the auxiliary frame at a location above the bottom wall of the main frame and below the lower cooking platen such that the lengthwise axis of the pressurized cylinders extend generally in a front to rear direction relative to the main frame during operation. A lever 105 is fixed to a shaft 106 that is rotatably mounted at its ends in the support members 25 on the auxiliary frame so that the lever is movable with the shaft about the axis of the shaft. The rod end of the cylinder is pivotally attached to the lever 105 at a location spaced from the axis of shaft 106. It is important that the support arm substantially avoid pressing the upper platen either upwardly or downwardly, When the support arm is in its lower position, so that the upper cooking platen can float relative to the support arm when the upper cooking platen is in its lower position. The means connecting the rear end of the upper platen support arm to a lever 105 is constructed and arranged to position the lever in a substantially dead center position with relation to the lengthwise axis of the cylinder means when the upper platen is supported on the lower platen, as shown in FIG. 2. With this arrangement, the upper platen can float relative to the support arm when the support arm is lowered. The means connecting the upper platen support arm is also arranged to move the lever in one angular direction away from the dead center position as the support arm is raised and the gas cylinder means is operative to aid in raising the support arm and upper platen when the lever is moved in the one angular direction out of the dead center position. A stop means is provided for stopping movement of the lever in the opposite direction away from the dead center position and, as shown in FIGS. 2 and 7, the lever 105 extends through an opening 23c in the panel 23a and engages the upper edge 23d of the opening 23c when in the dead center position to prevent movement of the lever in an upward direction out of the dead center position. If desired, an adjustable stop can be provided on the front panel for engaging the lever. In the embodiment shown in FIGS. 2, 5 and 7, a lever and link arrangement is provided for connecting the upper platen support arm to the lever 105. More specifically, lever 105 is a bell-crank type lever having an arm 105a extending in a angle to lever 105, and an arm 108 is mounted for movement with the upper platen support arm. A link 109 is pivotally connected to the arm 108 and to the arm 105a to move the lever 105 from the position shown in FIG. 2 to the position shown in FIG. 7, when the upper platen support arm is moved from its lower position to a raised position extending at an angle of approximately 60 degrees to a horizontal. As will be seen from FIGS. 2 and 7, when the platen support arm is raised to an angle of about 60 degrees to the horizontal, the lever 105 is moved through a somewhat greater angle of about 70 degrees. The upper platen support arm 31 and tubes 53 extend into the upper end of the auxiliary frame 21, and as shown in FIG. 2, a flexible bellows 118 of generally rectangular cross-sectional configuration is attached to the arms 32 and to the upper end of auxiliary frame to provide a grease seal therebetween.

Figure 8:
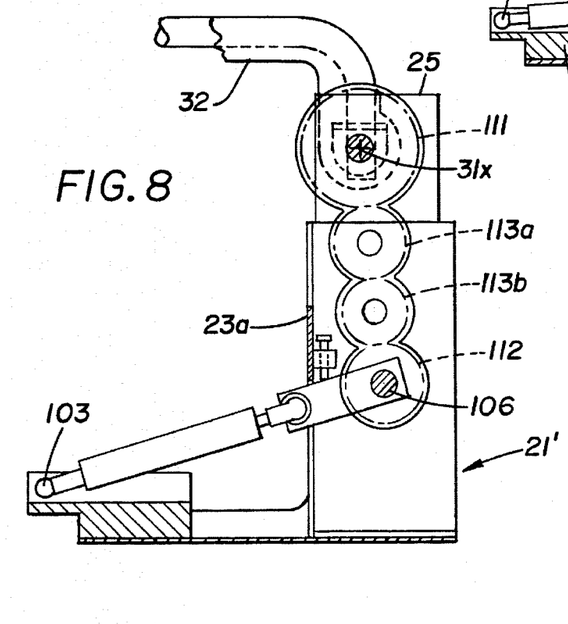
FIG. 8 is a fragmentary view illustrating a modified form of upper platen lift assist mechanism.

A gear type mechanism for connecting the upper platen support arm to the lever 105' is illustrated in FIG. 8. In this embodiment, a gear 111 is mounted for turning movement with the upper platen support arm about the axis 31x and is drivingly connected as by idler gears 113a and 113b to a gear 112 that rotates with the lever 105'. Gear 111 preferably has a greater pitch diameter than gear 112, so as to rotate the lever 105' through an angle greater than the angular movement of the support arm 32, to enhance the action of the pressurized cylinder in assisting raising of the upper platen at low platen angles.

Figure 10:
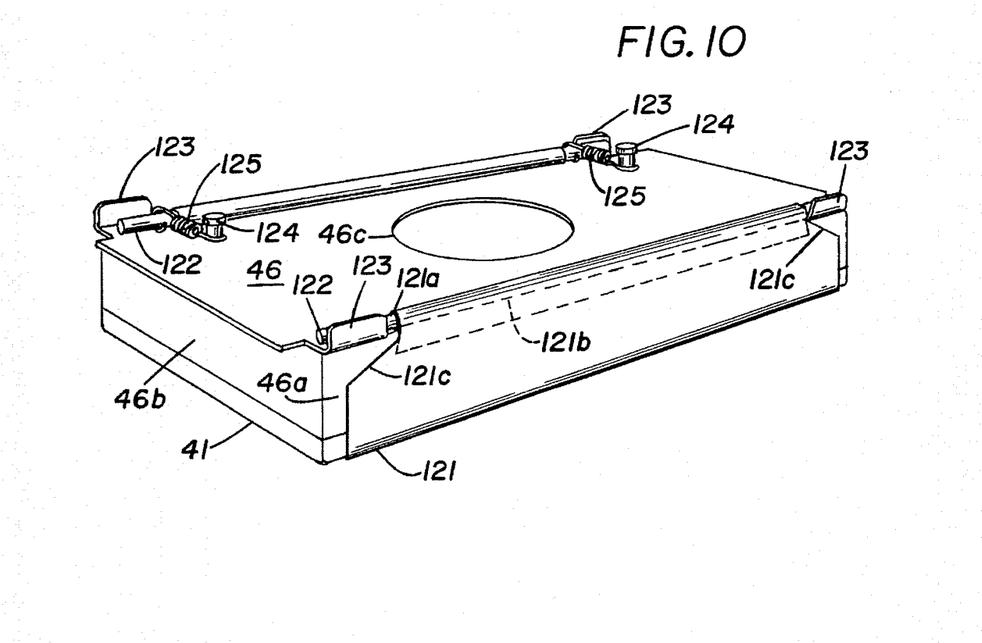
FIG. 10 is a perspective view of the upper platen with a material release sheet attached thereto.

It is common practice to provide a release sheet on the cooking face of the upper platen, to inhibit sticking of food products or parts thereof to the upper platen when it is raised. An improved arrangement for detachably securing a material release sheet 121 such as polytetrafluoroethylene to the upper platen and for maintaining the material release sheet taut and in intimate contact with the cooking surface is illustrated in FIG. 10. The material release sheet 121 is dimensioned to extend across the width of the cooking surface of the upper platen 41 and upwardly along the sides 46a of the platen cover, with hems 121a provided on the ends of the release sheet, as by stitching indicated at 121b, for receiving retainer rods 122. Projections 123 are provided on the top wall 46 of the upper platen cover, adjacent front and rear ends for engaging ends of at least one of the rods, and spring retainer posts 124 are provided on the top panel 46 at locations inwardly of one side edge of the top panel. After insertion of the rods 122 into the hems, the release sheet is mounted by first engaging opposite ends of one of the rods with the projections 122 at one side of the upper platen; then drawing the sheet across the lower surface of the upper platen and engaging the ends of the other rod with the projections at the other side of the panel 46. Tension springs 125 are provided with hooks or loops at opposite ends, and the springs are attached to opposite ends of the second rod and to respective ones of the spring retaining posts 124 to tension the release sheet across the cooking surface on the upper platen. The hemmed ends of the release sheet are preferably notched as indicated at 121c so that the rods project beyond the hemmed ends for engagement with the projections 123 and springs 125.

Figure 6:
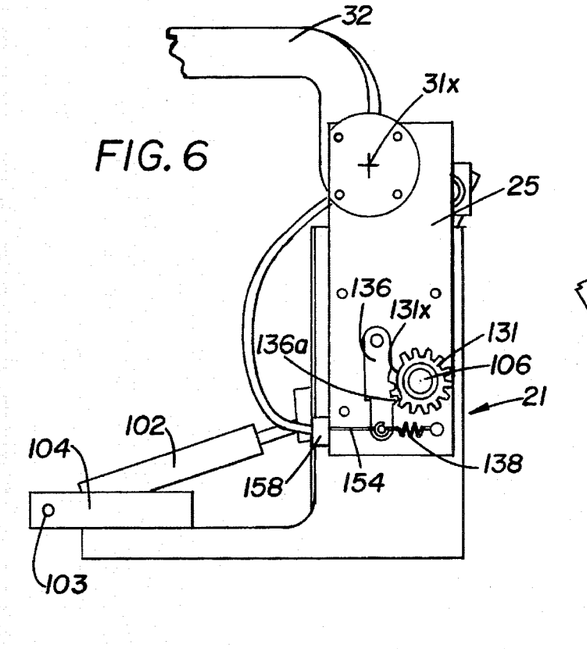
FIG. 6 is a fragmentary end view of the upper platen support.

Mechanism is advantageously provided for preventing abrupt lowering or dropping of the upper platen, as may occur in the event of failure of one or more of the pressurized gas cylinders 102. For this purpose, a ratchet wheel 131 is operatively connected to the support arm for turning in response to raising and lowering of the support arm. As best shown in FIG. 7, the ratchet wheel is mounted on shaft 106 for rotation with the lever 105, and a pawl 136 is pivotally mounted at 137 for movement into and out of engagement with the ratchet wheel. The pawl has teeth 136a and is yieldably urged into engagement with the ratchet wheel as by a spring 138. The ratchet wheel 131 rotates in a counter-clockwise direction as viewed in FIG. 6 when the support arm is moved from its lowered to its raised position and the teeth 136a on the pawl 136 are beveled in a manner to allow the ratchet wheel to rotate in a counter-clockwise direction, but hold the ratchet wheel against rotation in a clockwise direction. A manually operable release mechanism is mounted on the upper platen support arm and, as shown in FIG. 1, a U-shaped release handle 145 has ends slidably mounted in housings 146 on the support arm panel 33 and springs 147 are provided in the housing to engage abutments 148 on the handle to urge the latter forwardly. A means such as a Bowden wire cable and housing assembly is provided for connecting the handle to the pawl. The housing at one end of the Bowden wire is anchored to the upper platen support arm as indicated at 153 and the movable wire 154 of the cable is connected to one end of the handle 145. The Bowden wire extends through one of the conduits 53 and the housing at the second end of the Bowden wire cable is anchored at 158 on the auxiliary frame (FIG. 6). The movable wire 154 at the second end of the cable is attached to the pawl so that the pawl can manually be released by gripping the handle 145. As will be seen from FIGS. 1 and 2, the release handle 145 has a portion closely adjacent the lift handle 35 so that the release handle can be gripped and manipulated by fingers of the hands used for raising the upper platen. The weight of the upper platen is supported primarily by the pivots at the rear ends of the arms 32 when the upper platen is in a raised position and, if desired, the ratchet wheel 131 can be provided with missing teeth at a location indicated at 131x to allow the upper platen to be moved downwardly to selected angle, for example to a 45 degree angle, before the ratchet teeth engage the pawl.

The debris tray 14 is arranged to receive debris and oils scrapped rearwardly from the lower platen and the tray is provided with a discharge opening 14a, preferably located adjacent one of the side walls as shown in FIG. 1. A chute 161 (FIG. 2) extends downwardly from the discharge opening to a receiver. The receiver extends from the rear of the cooking apparatus to the front and includes an outer receiver tray 163 of U-shaped cross-section that is closed at its rear end, and an inner receiver tray 164 of U-shaped cross-section closed at its rear end as indicated at 164a and at its forward end by a front panel 165 having a handle 165a. The tray 164 is slidable in the outer tray 163, to facilitate removal for cleaning from the front of the cooking apparatus.

The embodiments of the invention in which an exclusive property or privilege is claimed are defined as follows:

1. A cooking apparatus comprising:

a support structure having spaced sides; a front and a rear;

a lower cooking platen mounted on the support structure;

a support arm having a rear end mounted on the support structure for movement about an arm pivot axis adjacent the rear of the structure between a lower position extending above the lower cooking platen and a raised position inclined upwardly from the lower cooking platen;

an upper cooking platen mounted on the support arm for movement therewith and having a lower cooking surface;

first and second ramp means mounted on the upper cooking platen at relatively opposite sides thereof, the first and second ramp means each including a stationary ramp member fixed to the upper platen and having a downwardly facing guide face inclined at an acute angle to the cooking surface of the upper platen, and a movable ramp member mounted on the stationary ramp member for sliding movement relative thereto along a path paralleling the guide face on the stationary ramp member, the movable ramp members each having means at a lower side thereof for engaging the lower platen at spaced locations; and upper platen adjusting means for slidably moving the movable ramp members relative to the associated stationary ramp members to adjust the minimum spacing between the upper and lower platens when the support arm is in a lower position.

2. A cooking apparatus according to claim 1 wherein the first and second ramp means are mounted at front and rear sides of the upper platen.

3. A cooking apparatus according to claim 1 wherein the upper platen adjusting means includes a lever mounted intermediate its ends on the upper platen for pivotal movement in a plane generally paralleling the cooking surface on the upper platen; the movable ramp member on the first ramp means having means engaging one end of the lever for movement thereby and the movable ramp member on the second ramp means having means engaging an opposite end of the lever for movement thereby, the downwardly facing guide faces on the first and second ramp means being inclined in relatively opposite directions.

4. A cooking apparatus according to claim 3 including means for selectively locking the lever against movement relative to the upper platen.

5. A cooking apparatus according to claim 1 wherein the first and second ramp means are mounted at front and rear sides of the upper platen, the upper platen adjusting means including a lever mounted intermediate its ends on the upper platen for pivotal movement in a plane generally paralleling the cooking surface of the upper platen; the movable ramp member on the first ramp means having means engaging one end of the lever for movement thereby and the movable ramp member on the second ramp means having means engaging an opposite end of the lever for movement thereby, the downwardly facing guide faces on the first and second ramp means being inclined in relatively opposite directions.

6. A cooking apparatus according to claim 5 wherein the upper platen adjusting means includes at least two platen engaging feet on each movable ramp member, the platen engaging feet being individually adjustable relative to the associated movable ramp member.

7. A cooking apparatus according to claim 1 including a debris tray extending along a rear edge of the lower platen and having a discharge outlet, the pivot axis of the support arm being disposed rearwardly of the debris tray.

8. A cooking apparatus according to claim 7 including an elongate debris receptacle mounted on the support structure and having a rear end disposed below the discharge outlet and a forward end adjacent the front of the support structure, the debris receptacle being slidable along a lengthwise path and arranged for removal at the front of the support structure.

9. A cooking apparatus according to claim 1 including an upper platen cover having a top panel overlying the upper cooking panel and side panels at opposite sides of the upper cooking platen, a sheet of material having nonstick characteristics and a hem at opposite side edges, a rod slidable in each hem, a pair of projections extending above the top panel of the cover adjacent one cover side panel for engaging the rod in one of the hems, a pair of spring anchors extending above the top panel of the cover at a location spaced inwardly of a second cover side panel, and a pair of tension springs engageable with the spring anchors and with the rod in the other of the hems for tensioning the sheet of material across the cooking surface of the upper cooking platen.

10. A cooking apparatus according to claim 1 including upper platen lift assist means, said lift assist means including a lever means mounted on the support structure for pivotal movement about a lever pivot axis spaced below and parallel to the arm pivot axis, pressurized gas cylinder means having a lengthwise axis with one end pivotally mounted on the support structure at a location forwardly of the lever pivot axis and a second end pivotally connected to the lever at a location spaced from the lever pivot axis, means operatively connecting the upper platen support arm to the lever for positioning the lever in a substantially dead center position with relation to the lengthwise axis of the cylinder means when the upper platen is supported by the ramp means on the lower platen, said means connecting the upper platen to the support arm being arranged to move the lever in one angular direction out of the dead center position as the support arm is raised, said cylinder means being operative to aid in raising the support arm and upper platen when the lever is moved in said one angular direction away from the dead center position, and stop means for stopping movement of said lever in a second angular direction away from said dead center position.

11. A cooking apparatus according to claim 10 wherein said means connecting the support arm to the lever includes a first arm movable with the support arm and a second arm movable with the lever, and a link interconnecting said first and second arms.

12. A cooking apparatus according to claim 10 wherein said means connecting the support arm to the lever is constructed and arranged to move the lever in said one angular direction through an angle greater than the angular movement of the upper platen support arm.

13. A cooking apparatus according to claim 10 wherein said support structure includes a main support frame and an auxiliary frame, the support arm and the lever and the gas cylinder means being mounted on the auxiliary frame for installation and removal as a unit on the main support frame, and means for detachably securing the auxiliary frame to the main support frame.

14. A cooking apparatus according to claim 13 including a debris tray extending along a rear edge of the lower platen and having a discharge outlet, the pivot axis of the support arm being disposed rearwardly of the debris tray, an elongate debris receptacle mounted on the support structure and having a rear end disposed below the discharge outlet and a forward end adjacent the front of the support structure, the debris receptacle being slidable along a lengthwise path and arranged for removal at the front of the support structure.

15. A cooking apparatus comprising:

a support structure including a main frame having spaced sides, a front, a bottom and an opening at a rear side, and an auxiliary frame having a base portion and an upright rear portion extending upwardly adjacent a rear end of the base portion;

a lower cooking platen fixedly mounted on the main frame and having an upper cooking surface;

a support arm having a rear end mounted on the rear portion of the auxiliary frame for movement about an arm pivot axis adjacent an upper end of the rear portion of the auxiliary frame for movement between a lower position extending above the lower cooking platen and a raised position inclined upwardly from the lower cooking platen;

an upper cooking platen mounted on the support arm for movement therewith and having a lower cooking surface;

means on the upper platen engageable with the lower platen for adjustably controlling the spacing between the upper platen and the lower platen when the support arm is in its lower position;

upper platen lift assist means including lever means mounted on the rear portion of the auxiliary frame for pivotal movement about a lever pivot axis spaced below and parallel to the arm pivot axis, pressurized gas cylinder means having a lengthwise axis and a forward end pivotally mounted on the base portion adjacent a forward end of the latter and a rear end pivotally connected to the lever at a location spaced from the lever pivot axis, means connecting the rear end of upper platen support arm to the lever and constructed and arranged to position the lever in a substantially dead center position with relation to the lengthwise axis of the cylinder means when the upper platen is supported on the lower platen, said means connecting the upper platen to the support arm being arranged to move the lever in one angular direction away from the dead center position as the support arm is raised, said cylinder means being operative to aid in raising the support arm and upper platen when the lever is moved in said one angular direction out of the dead center position, stop means for stopping movement of the lever in a second direction away from the dead center position, the support arm and upper platen and lever and gas cylinder means being assembled on the auxiliary frame for installation or removal as a unit on the main frame with the base portion of the auxiliary frame extending through the opening at the rear of the main frame, and means for detachably mounting the base portion of the auxiliary frame on the bottom of the main frame.

16. A cooking apparatus according to claim 15 including a bellows of rectangular cross-sectional configuration surrounding a rear portion of the support arm and having one end attached to the support arm for movement therewith and a second end attached to an upper end of the rear portions of the auxiliary frame.

17. A cooking apparatus according to claim 15 including means for controlling lowering of the upper platen comprising a ratchet wheel operatively connected to the support arm for turning in response to raising and lowering of the support arm, a pawl yieldably biased into engagement with the ratchet wheel and arranged to allow raising of the support arm and to interrupt downward movement of the support arm during lowering of the support arm, and manually operable means on the support arm for releasing the pawl to enable lowering of the upper platen to the lower position.

18. A cooking apparatus according to claim 17 wherein the pawl has interrupted teeth at a location to avoid interrupting downward movement of the upper arm from a fully raised position to a preselected position above the lower position.

19. A cooking apparatus according to claim 17 wherein the ratchet wheel is mounted for turning with the lever.

20. A cooking apparatus according to claim 15 including a debris tray extending along a rear edge of the lower platen and having a discharge outlet, said rear portion of the auxiliary frame being disposed at the rear side of the debris tray.

21. A cooking apparatus according to claim 15 including a bellows having a rectangular cross-sectional configuration surrounding a rear portion of the platen support arm and having one end attached to the support arm and a second end attached to the rear portion of the auxiliary frame to provide grease seal therebetween.

22. A cooking apparatus according to claim 15 wherein the means engageable with the lower platen for adjusting the spacing between the upper platen and the lower platen includes first and second ramp means mounted on the upper cooking platen at relatively opposite sides thereof, the first and second ramp means each including a stationary ramp member fixed to the upper platen and having a downwardly facing guide face inclined at an acute angle to the cooking surface of the upper platen, and a movable ramp member mounted on the stationary ramp member for sliding movement relative thereto along a path paralleling the guide face on the stationary ramp member, the movable ramp member having means at a lower side thereof for engaging the lower platen at spaced locations; and means for slidably moving the movable ramp members relative to the associated stationary ramp members to adjust the spacing between the upper lower platens when the support arm is moved to its lower position.

23. A cooking apparatus according to claim 22 wherein the first and second ramp means are mounted at front and rear sides of the upper platen.

24. A cooking apparatus according to claim 22 wherein the upper platen adjusting means includes a lever mounted intermediate its ends on the upper platen for pivotal movement in a plane generally paralleling the cooking surface on the upper platen; the movable ramp member on the first ramp means having means engaging one end of the lever for movement thereby and the movable ramp member on the second ramp means having means engaging an opposite end of the lever for movement thereby, the downwardly facing guide faces on the first and second ramp means being inclined in relatively opposite directions.

25. A cooking apparatus according to claim 15 including an upper platen cover having a top panel overlying the upper cooking panel and side panels at opposite sides of the upper cooking platen, a sheet of material having non-stick characteristics and a hem at opposite side edges, a rod slidable in each hem, a pair of projections extending above the top panel of the cover adjacent one cover side panel for engaging the rod in one of the hems, a pair of spring anchors extending above the top panel of the cover at a location spaced inwardly of a second cover side panel, and a pair of coil type springs engageable with the spring anchors and the rod in the other of the hems for tensioning the sheet of material across the cooking surface of the upper cooking platen.

26. A cooking apparatus comprising:

a support structure having spaced sides, a front, a bottom and an opening at a rear side;

a lower cooking platen mounted on the main frame and having an upper cooking surface;

a support arm having a rear end mounted on the support structure for angular movement about an axis adjacent an upper end of the rear portion of the auxiliary frame for movement between a lower position extending above the lower cooking platen and a raised position inclined upwardly from the lower cooking platen;

an upper cooking platen mounted on the support arm for movement therewith and having a lower cooking surface;

means on the upper platen engageable with the lower platen for adjustably controlling the spacing between the upper platen and the lower platen when the support arm is in its lower position;

upper platen lift assist means including lever means operatively connected to the support arm for angular, movement about an axis in response to raising and lowering of the support arm, pressurized gas cylinder means having a lengthwise axis and one end pivotally mounted on the stationary structure and a second end pivotally connected to the lever at a location spaced from the lever axis, said means connecting the upper platen support arm to the lever and constructed and arranged to position the lever in a substantially dead center position with relation to the lengthwise axis of the cylinder means when the upper platen is supported on the lower platen, said means connecting the upper platen to the support arm being arranged to move the lever in one angular direction away from the dead center position as the support arm is raised, said cylinder means being operative to aid in raising the support arm and upper platen when the lever is moved in said one angular direction out of the dead center position, stop means for stopping movement of the lever in a second direction away from the dead center position.

27. A cooking apparatus according to claim 26 including means for controlling lowering of the upper platen comprising a ratchet wheel operatively connected to the support arm for turning in response to raising and lowering of the support arm, a pawl yieldably biased into engagement with the ratchet wheel and arranged to allow raising of the support arm and to interrupt downward movement of the support arm during lowering of the support arm, and manually operable means on the support arm for releasing the pawl to enable lowering of the upper platen to the lower position.

28. A cooking apparatus according to claim 27 wherein the pawl has interrupted teeth at a location to avoid interrupting downward movement of the upper arm from a fully raised position to a preselected position above the lower position.

29. A cooking apparatus according to claim 28 wherein the ratchet wheel is mounted for turning with the lever.

30. A cooking apparatus according to claim 26 including a bellows of rectangular cross-sectional configuration surrounding a rear portion of the support arm and having one end attached to the support arm for movement therewith and a second end attached to an upper end of the rear portions of the auxiliary frame.

31. A cooking apparatus according to claim 26 including an upper platen cover having a top panel overlying the upper cooking panel and side panels at opposite sides of the upper cooking platen, a sheet of material having non-stick characteristics and a hem at opposite side edges, a rod slidable in each hem, a pair of projections extending above the top panel of the cover adjacent one cover side panel for engaging the rod in one of the hems, a pair of spring anchors extending above the top panel of the cover at a location spaced inwardly of a second cover side panel, and a pair of coil type springs engageable with the spring anchors and the rod in the other of the hems for tensioning the sheet of material across the cooking surface of the upper cooking platen.

32. A cooking apparatus according to claim 26 wherein the means for adjustably controlling the spacing between the upper platen includes first and second ramp means mounted on the upper cooking platen at relatively opposite sides thereof, the first and second ramp means each including a stationary ramp member fixed to the upper platen and having a downwardly facing guide face inclined at an acute angle to the cooking surface of the upper platen, and a movable ramp member mounted on the stationary ramp member for sliding movement relative thereto along a path paralleling the guide face on the stationary ramp member, the movable ramp members each having means at a lower side thereof for engaging the lower platen at spaced locations; and upper platen adjusting means for slidably moving the movable ramp members relative to the associated stationary ramp members to adjust the spacing between the upper lower platens when the support arm is moved to its lower position.

\* \* \* \* \*